(12) United States Patent
Ibuka (10) Patent No.: US 7,005,907 B2
(45) Date of Patent: Feb. 28, 2006

(54) INTEGRATED CIRCUIT DEVICE WITH CLOCK SKEW REDUCED

(75) Inventor: Hiroshi Ibuka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/458,643

(22) Filed: Jun. 11, 2003

(65) Prior Publication Data

US 2003/0231043 A1 Dec. 18, 2003

(30) Foreign Application Priority Data

Jun. 12, 2002 (JP) .............................. 2002-170836

(51) Int. Cl.
*G06F 1/04* (2006.01)
(52) U.S. Cl. ...................... 327/295; 327/565; 327/156
(58) Field of Classification Search ................ 327/291, 327/292, 293, 295, 297, 564, 565, 155, 156
See application file for complete search history.

(56) References Cited

U.S. PATENT DOCUMENTS

| | | | |
|---|---|---|---|
| 5,172,330 A | | 12/1992 | Watanabe et al. ............ 364/491 |
| 5,396,129 A | | 3/1995 | Tabira .......................... 326/93 |
| 5,420,544 A | * | 5/1995 | Ishibashi ..................... 331/11 |
| 5,686,845 A | * | 11/1997 | Erdal et al. .................... 326/93 |
| 5,696,953 A | | 12/1997 | Wong et al. ................. 395/560 |
| 6,111,448 A | * | 8/2000 | Shibayama .................. 327/293 |
| 6,201,448 B1 | | 3/2001 | Tam et al. .................... 331/25 |
| 6,384,659 B1 | * | 5/2002 | Inohara ....................... 327/295 |
| 6,429,715 B1 | * | 8/2002 | Bapat et al. ................. 327/295 |

FOREIGN PATENT DOCUMENTS

| | | |
|---|---|---|
| EP | 0 258 975 A | 3/1988 |
| JP | 61-263241 | 11/1986 |
| JP | 63-107316 | 5/1988 |
| JP | 05-136125 | 6/1993 |
| JP | 5-159080 | 6/1993 |
| JP | 7-58205 | 3/1995 |
| JP | 7-169914 | 7/1995 |
| JP | 11-191610 | 7/1999 |
| JP | 11-204649 | 7/1999 |
| JP | 11-317457 | 11/1999 |
| JP | 2000-35832 | 2/2000 |
| JP | 2000-200114 | 7/2000 |
| JP | 2000-223577 | 8/2000 |
| JP | 2001-142931 | 5/2001 |
| JP | 2001-320022 | 11/2001 |
| JP | 2002-049438 | 2/2002 |

OTHER PUBLICATIONS

European Search Report dated Sep. 28, 2004.
Japanese Office Action dated Mar. 1, 2005 with a partial English translation.
Japanese Office Action dated Aug. 16, 2005 (with partal English translation).

* cited by examiner

*Primary Examiner*—Timothy P. Callahan
*Assistant Examiner*—An T. Luu
(74) *Attorney, Agent, or Firm*—McGinn IP Law Group, PLLC (57) ABSTRACT

In an integrated circuit device, a clock signal distribution section is arranged in an outer circumferential area of a semiconductor chip to supply a clock signal. Each of interface circuit blocks has at least an internal circuit operating based on the clock signal supplied from the clock signal distribution section.

18 Claims, 5 Drawing Sheets

INTEGRATED CIRCUIT DEVICE WITH CLOCK SKEW REDUCED

BACKGROUND OF THE INVENTION

1. Field of the Invention

The present invention relates to an integrated circuit device, particularly to an integrated circuit device which is designed to distribute and supply an external clock signal to an internal circuit of a chip.

2. Description of the Related Art

It is necessary to distribute and supply an external clock signal to an internal circuit of a chip for an integrated circuit device such as LSI. Generally, the internal circuit of the chip is composed of sequential circuits such as F/Fs (Flip-Flops). The F/F of the sequential circuit is designed to carry out data transfer in synchronization with the clock signal. For this purpose, it is necessary to supply the clock signal into respective F/Fs with a same timing. However, the difference in the supply timing of clock signal called clock skew is inherent in the design. Recently, especially, a permissible clock skew becomes small very much because of the increase in the clock signal frequency, and the reduction of clock skew is essential in a clock signal distribution network. The frequency of a clock signal used in a high-speed interface macro (circuit block) is higher than that in other portions, and the permissible clock skew is particularly severe.

The major factor of clock skew is the delay difference caused by the difference in a wiring line length to the F/Fs. As a clock signal distribution method to solve the clock skew, for example, a clock signal distribution system so-called H-tree is widely used in which the wiring line lengths to the F/Fs to operate in synchronism with the clock signal are geometrically equal to each other. An outline of such a clock signal distribution system is shown in FIG. 5.

Figure 5:
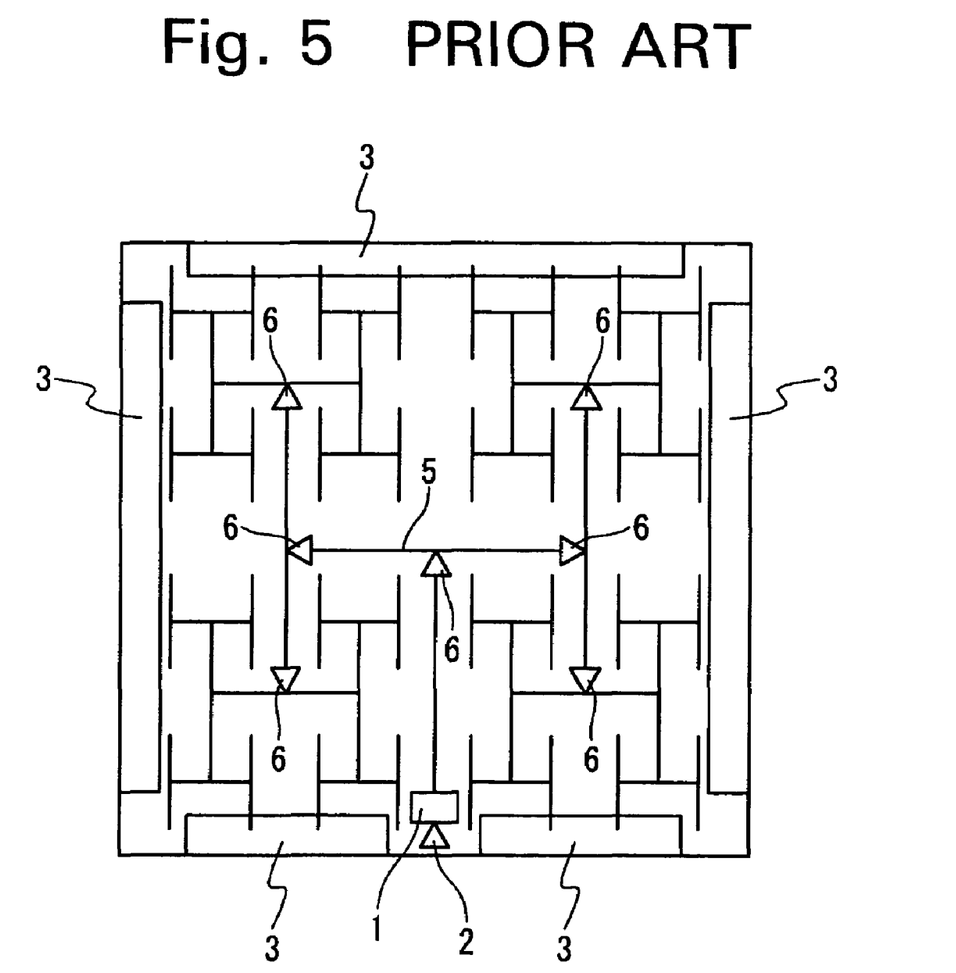
FIG. 5 is a diagram showing a conventional example of an integrated circuit device.

In FIG. 5, high-speed interface macros 3 are arranged in the outer circumferential portion of a chip. An H-tree distribution system is composed of clock signal distribution wiring lines 5 and clock signal drivers 6. An external clock signal is delivered through a clock signal input buffer 2 and is separated into two clock signals by a first clock signal driver 6 through a PLL circuit 1 for phase adjustment. The separated clock signal is distributed to the high-speed interface macros 3 and an internal logic circuit area, which is not shown, by the H-tree distribution system.

As described above, the clock signal wiring lines are provided all over the surface of the chip from the internal logic circuit area to the high-speed interface macros in the clock signal distribution system shown in FIG. 5, Consequently, a delay from the PLL circuit 1 to the F/F within the macro increases, and the number of clock signal drivers 6 also increases. As a result, the clock signal distribution system is susceptible to the influence of clock skew due to crosstalk noise and jitter due to power supply noise, and has shortcomings that the clock skew tends to increase. As a result, the clock signal distribution system is susceptible to the influence of clock skew due to crosstalk noise and jitter due to power supply noise, and has shortcomings that the clock skew tends to increase.

Furthermore, when the wiring lines of the internal logic circuit are designed by using a tool such as a clock tree synthesis (CTS), the densities of wiring lines are different depending on parts of the chip. Therefore, even if the clock signal wiring lines are designed by using the H-tree structure to have same load and same wiring line length, the clock signal distribution system has shortcomings that skew is caused by the difference in the coupling capacitance with an wiring line in the internal logic circuit.

In the case of the H-tree, the clock signal is distributed all over the surface of the chip. Therefore, clock skew is easily caused due to manufacturing variations on the LSI chip surface. Also, the arrangement of clock signal wiring lines and the clock signal drivers is restricted depending on the form of the macros when the clock signal is distributed to plural kinds of high-speed interface macros different in form from each other.

In conjunction with the above description, a clock signal distribution circuit in a gate array is disclosed in Japanese Laid Open Patent Application (JP-A-Showa 63-107316). The clock signal distribution circuit of this conventional example has a clock signal driver, circuit blocks and a clock signal bus for a clock signal to be supplied from the clock signal driver. The clock signal bus is arranged to surround the circuits.

Also, a logic integrated circuit is disclosed in Japanese Laid Open Patent Application (JP-A-Showa 63-107316). In the logic integrated circuit of this conventional example, a chip area is divided into a plurality of blocks with same area. A clock signal distribution system is provided for every block to contain a clock signal input terminal and a buffer circuit connected with the input terminal. The clock signal distribution system is branched repetitively toward circuits provided in a tip portion of the block.

Also, a semiconductor logic integrated circuit is disclosed in Japanese Laid Open Patent Application (JP-A-Heisei 7-58205). In the semiconductor logic integrated circuit of this conventional example, a channel area exclusive for a clock signal wiring line is provided for the center of a semiconductor chip. An wiring line which supplies a clock signal to each section of an internal logic circuit is provided for the exclusive use channel area. A general signal line is not provided in the exclusive use channel area. Thus, it is prevented that the general signal line and the clock signal wiring line are arranged adjacent to each other and in parallel to each other. Therefore, it is possible to prevent noise on the signal and the clock signal through cross talk between the general signal line and the clock signal wiring line and clock skew in a clock distribution system due to the wiring line capacitance. Also, when an automatic wiring line designing is carried out by using a computer, the layout of the general signal lines and the gates are hardly restricted by providing clock wiring lines. Thus, the channel usage and the gate usage are improved.

Also, a semiconductor integrated circuit is disclosed in Japanese Laid Open Patent Application (JP-A-Heisei 7-169914). The semiconductor integrated circuit of this conventional example is composed of logic calculating sections in each of which many logic gates are arranged, and an input/output section in which input/output buffers are arranged to surround the logic calculating section. A first clock signal path for transferring a clock signal is arranged to connect opposing central portions of the two logic calculating sections. The logic gates are arranged in a ring in a surrounded internal portion and an outer portion. A second clock signal path is connected to the first clock signal path and has branch lines extending into the outer portion.

Also, an integrated circuit and a method of designing wiring line are disclosed in Japanese Laid Open Patent Application (JP-A-Heisei 11-317457). The integrated circuit of this conventional example has a plurality of partial circuits which are arranged in rectangular partial circuit arrangement areas with approximately same size on a semiconductor substrate and are composed of a plurality of basic logic circuits. Each of a plurality of clock signal supply sections is approximately in the center of a corresponding one of the partial circuit arrangement areas. The clock signal supply section supplies a clock signal to the basic logic circuit of the corresponding partial circuit to specify the timings of the operation based on a reference clock. The clock signal distribution line is separated into lines with a H-character shape with approximately equal lengths and the reference signal is distributed into the clock signal supply sections. The partial circuits, the clock signal supply sections, and the clock signal distribution line are formed on the semiconductor substrate, and carry out predetermined logic operation in synchronism with the reference clock signal. In order to make the reaching time of the clock signal from each clock signal supply section to the partial circuit equal approximately, a load section with no relation to the predetermined logic operation in addition to the basis logic circuit.

Also, a semiconductor integrated circuit is disclosed in Japanese Laid Open Patent Application (JP-P2000-35832A). In the semiconductor integrated circuit of this conventional example, a first clock signal distribution circuit outputs a clock signal onto a fixed clock signal wiring line and at least a second clock signal distribution circuit is connected with the fixed clock signal wiring line. The clock signal outputted from the second clock signal distribution circuit is distributed to sequential circuits of the semiconductor integrated circuit.

Also, a clock distribution circuit is disclosed in Japanese Laid Open Patent Application (JP-P 2000-200114A). The clock distribution circuit of this conventional example is composed of a plurality of a plurality of blocks each having a plurality of circuits. A first clock signal driver distributes a clock signal to each of the blocks. Second clock signal drivers are provided for each of the blocks to distribute the clock signal to the circuit of the block. First wiring lines connects the first clock signal driver and the second clock signal drivers for the clock signal with the same phase to reach the second clock signal drivers. A second wiring line is provided to connect the second clock signal driver to the circuit. The longest length of the second wiring line is smaller than a product of a permissible clock skew and a propagation velocity of electromagnetic wave to be transmitted on the second wiring line.

Also, an integrated circuit is disclosed in Japanese Laid Open Patent Application (JP-P 2001-320022A). The integrated circuit of this conventional example is composed of a frequency dividing section for dividing a clock signal in frequency into 1/n (n is a positive integer) to generate a frequency-divided clock signal, and a plurality of driver circuits for outputting the frequency-divided clock signal onto a plurality of main wiring lines. A plurality of normal clock signal driver circuits have delay sections and driver sections. The delay section delays the frequency-divided clock signal to output a normal clock signal, and the driver section outputs the normal clock signal to a corresponding one of normal main wiring lines. A clock signal distribution circuit is composed of clock wiring lines for distributing the clock signal inputted from a clock signal input circuit, and a plurality of clock distribution relay buffers for receiving the frequency-divided and supplying the frequency-divided to the frequency dividing section and the driver circuits. A short circuit wiring line connect all outputs of the clock distribution relay buffers. A short circuit wiring line connects all outputs of the driver circuits. A short circuit wiring line connects all outputs of the normal clock signal driver circuits.

SUMMARY OF THE INVENTION

Therefore, an object of the present invention is to provide an integrated circuit device in which it is difficult to receive influence of noises such as crosstalk noise and power supply noise, and clock skew can be suppressed by making an wiring line length for a clock signal to a high-speed interface macro as short as possible.

In an aspect of the present invention, an integrated circuit device includes a clock signal distribution section arranged in an outer circumferential area of a semiconductor chip to supply a clock signal; and interface circuit blocks, each of which has at least an internal circuit operating based on the clock signal supplied from the clock signal distribution section.

Here, the interface circuit blocks may be arranged in an area of the semiconductor chip adjacent to the clock signal distribution section.

Also, the integrated circuit device may further include an external clock signal driver which receives an external clock signal; and a PLL circuit which is arranged to generate the clock signal from the external clock signal supplied from the external clock signal driver and a feedback clock signal from one of the interface circuit blocks. In this case, the external clock signal driver may be arranged at a corner of the semiconductor chip. Also, the PLL circuit may be arranged to be adjacent to the external clock signal driver and the one interface circuit block.

Also, the one interface circuit block may receive the clock signal from the clock signal distribution section at a first terminal and output the feedback clock signal to the PLL circuit through a second terminal, and the second terminal may be arranged such that a delay of the clock signal from the first terminal to the internal circuit is equal to a delay from the first terminal to the second terminal. In this case, a signal delay from an input point of the external clock signal to the PLL circuit may be set to be equal to a signal delay from the second terminal to the PLL circuit.

Also, the clock signal distribution section may include clock signal distribution wiring lines, each of which transfers the clock signal; and clock signal drivers, each of which is arranged at each of ends of each of the clock signal distribution wiring lines. In this case, the clock signal distribution wiring lines may be arranged to form a tree structure. Also, the clock signal distribution wiring lines may be same in lengths to the internal circuits of the interface circuit blocks. Also, the clock signal distribution wiring lines may be same in loads to the internal circuits of the interface circuit blocks.

In another aspect of the present invention, an integrated circuit device includes a clock signal distribution section arranged in an outer circumferential area of a semiconductor chip to supply a clock signal; and interface circuit blocks, each of which has at least an internal circuit operating based on the clock signal supplied from the clock signal distribution section. The clock signal distribution section includes clock signal distribution wiring lines, each of which transfers the clock signal; and clock signal drivers, each of which is arranged at each of ends of each of the clock signal distribution wiring lines. In addition, the interface circuit blocks are arranged in an area of the semiconductor chip adjacent to the clock signal distribution section.

Here, the integrated circuit device may further include an external clock signal driver which receives an external clock signal; and a PLL circuit which is arranged to generate the clock signal from the external clock signal supplied from the external clock signal driver and a feedback clock signal from one of the interface circuit blocks. In this case, the external clock signal driver may be arranged at a corner of the semiconductor chip. Also, the PLL circuit may be arranged to be adjacent to the external clock signal driver and the one interface circuit block.

Also, the one interface circuit block may receive the clock signal from the clock signal distribution section at a first terminal and output the feedback clock signal to the PLL circuit through a second terminal. At that time, the second terminal is arranged such that a delay of the clock signal from the first terminal to the internal circuit is equal to a delay from the first terminal to the second terminal. In this case, a signal delay from an input point of the external clock signal to the PLL circuit may be set to be equal to a signal delay from the second terminal to the PLL circuit.

Also, the clock signal distribution wiring lines may be arranged to form a tree structure. The clock signal distribution wiring lines may be same in lengths to the internal circuits of the interface circuit blocks. Also, the clock signal distribution wiring lines may be same in loads to the internal circuits of the interface circuit blocks.

DESCRIPTION OF THE PREFERRED EMBODIMENTS

Figure 1:
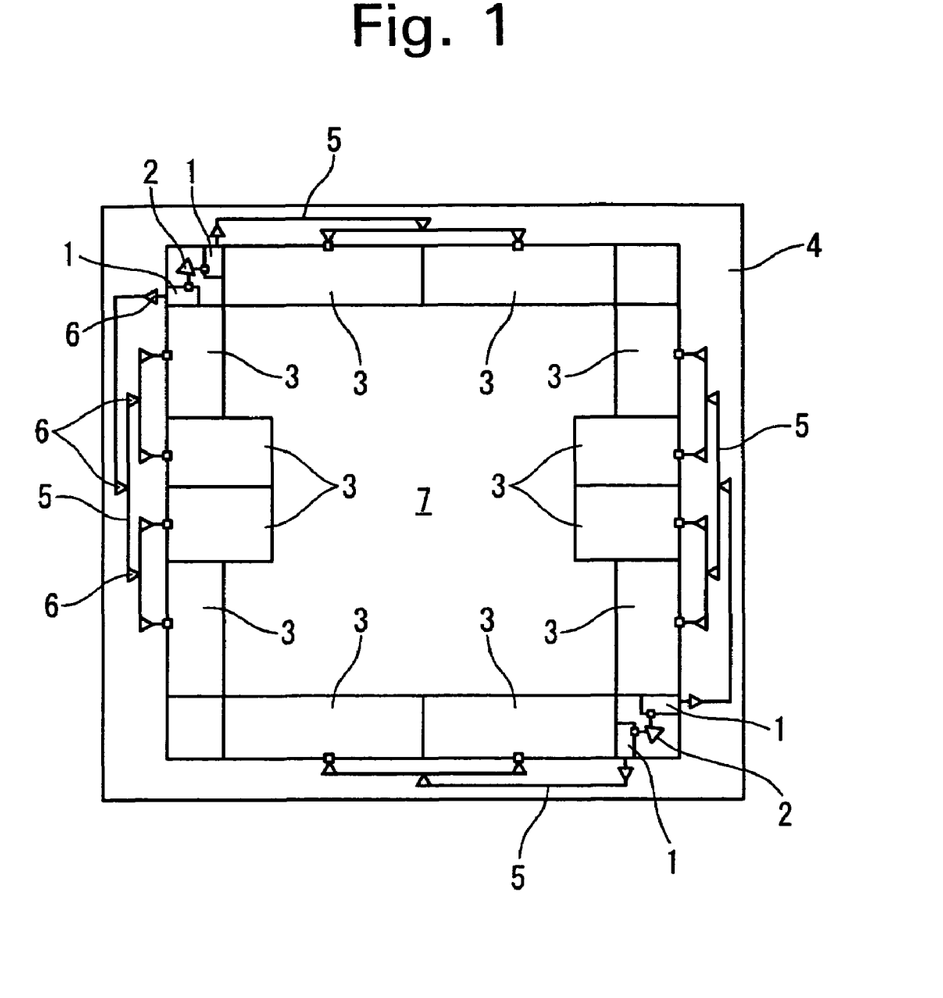
FIG. 1 is a diagram showing the structure of an integrated circuit device according to a first embodiment of the present invention.

Embodiments according to the present invention will be described below with reference to the attached drawings. Referring to FIG. 1, an embodiment of the present invention is shown as an LSI composed of a plurality of clock signal input buffers 2, a plurality of PLL circuits 1, and a plurality of interface macros 3. A clock signal supplied from the outside of the LSI is inputted into the inside of the LSI through the plurality of clock signal input buffers 2 arranged at the corners of a chip, and then distributed to the PLL circuits 1 arranged near the input buffers.

Figure 2:
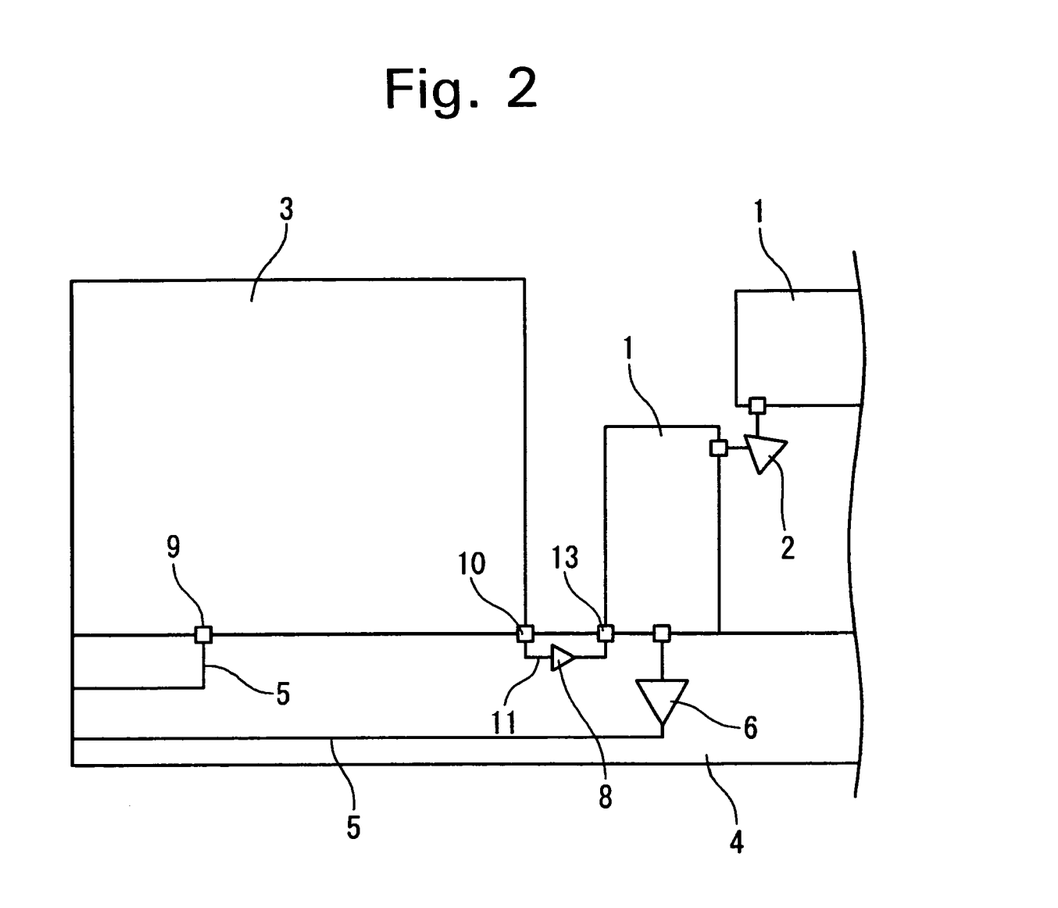
FIG. 2 is a magnified view showing a portion of the diagram shown in FIG. 2.

Clock signal wiring lines (wiring lines) 5 and clock signal drivers 6 are connected to the output of each PLL circuit 1 to distribute the clock signal to the high-speed interface macros 3. Lower speed circuits are located in the interior area 7 inside the high-speed interface macros 3. The clock signal wiring lines 5 and the clock signal drivers 6 are arranged in an outermost circumferential area 4 of the LSI chip. As shown in FIG. 2 which is a magnified view of the neighborhood of the lower right portion of FIG. 1, the clock signal distributed by the clock signal driver 6 is inputted into a clock signal input terminal 9 of the high-speed interface macro 3 through the clock signal wiring line 5.

The high-speed interface macro 3 is arranged in an area adjacent to the clock signal distribution area 4 in the outermost circumferential section, as shown in FIG. 1, and the clock signal input terminal 9 is arranged in the boundary portion between the clock signal distribution area 4 and the high-speed interface macro 3. A feedback circuit from the high-speed interface macro 3 to the PLL circuit 1 (composed of an wiring line 11 and an input buffer delay compensation circuit 8) is configured so that the wiring line length is short. For example, a feedback clock signal output terminal 10 for the feedback from the high-speed interface macro 3 is arranged, as shown in FIG. 2.

Figure 3:
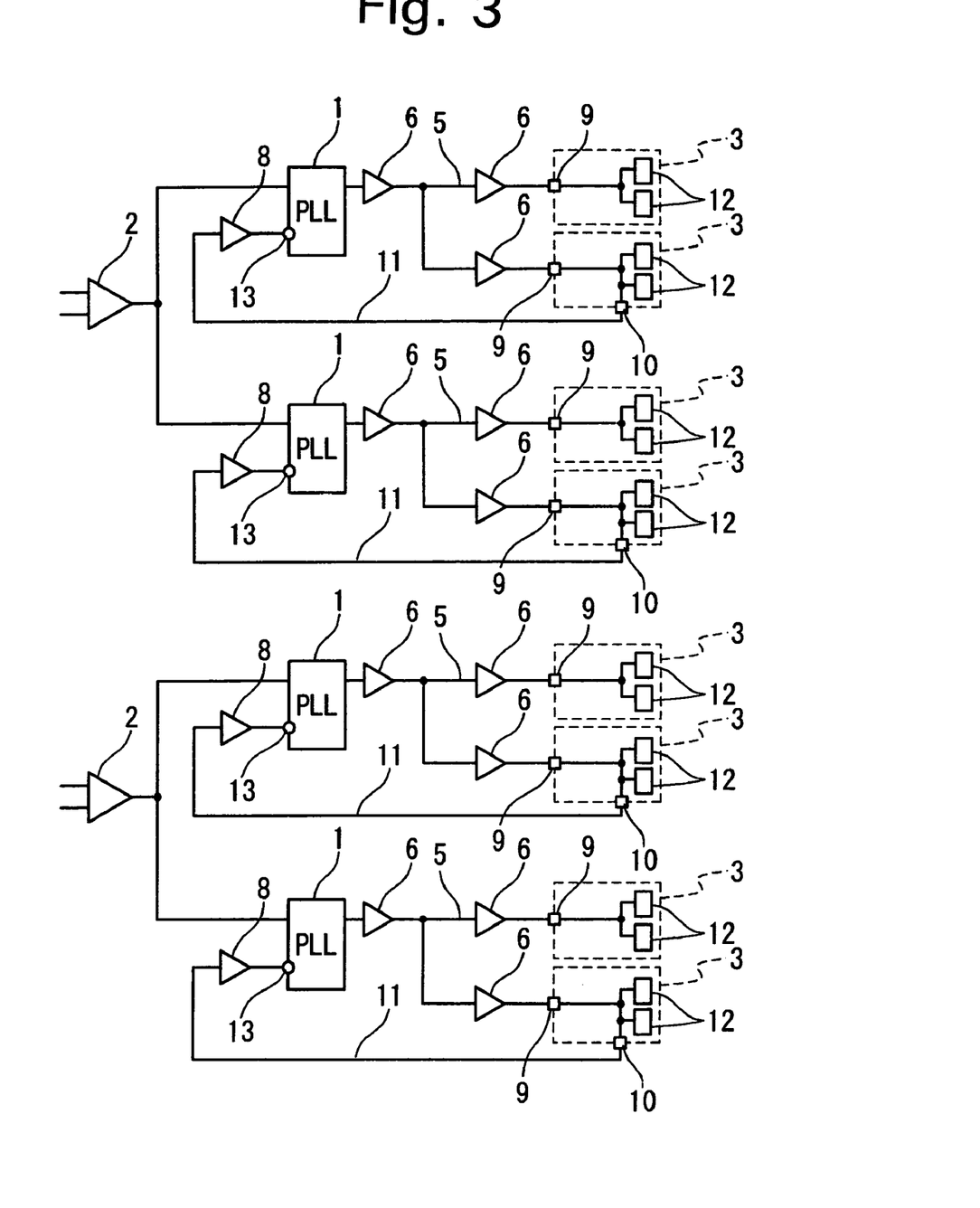
FIG. 3 is a diagram showing an equivalent circuit of the integrated circuit device according to the first embodiment of the present invention.

FIG. 3 illustrates an equivalent circuit of the circuit shown in FIG. 1 and FIG. 2, and the same portion is indicated by the same reference numeral or symbol in these respective figures. The operation in the present embodiment will be described below with reference to the FIG. 3.

A clock signal supplied from the outside of the LSI chip is inputted into the two clock signal input buffers 2 on the LSI chip at the same timing, and then inputted to the PLL circuits 1. The PLL circuit 1 adjusts the phase difference between the clock signal which is inputted from the outside of the LSI through the clock signal input buffer 2 (a reference clock signal) and a clock signal which is fed back from the feedback clock signal output terminal 10 of the high-speed interface macro 3 to the PLL circuit 1 (a feedback clock signal), and also the clock signal multiplied in frequency from the frequency of the reference clock signal to the frequency used in the high-speed interface macro 3 is outputted from the PLL circuit 1.

The clock signal outputted from the PLL circuit 1 is distributed to the clock signal output terminal 9 of the high-speed interface macro 3 through the clock signal driver 6 and the clock signal wiring line 5 arranged in the clock signal distribution area 4 in FIG. 1. The high-speed interface macro 3 in the figure is a hard macro, and a clock signal wiring line is provided within the macro from the clock signal output terminal 9 to an F/F 12. The feedback clock signal output terminal 10 is arranged so that a delay value from the clock signal input terminal 9 to the F/F 12 in the macro is equal to a delay value from the clock signal input terminal 9 to the feedback clock signal output terminal 10.

Also, the input buffer delay compensation circuit 8 is provided on the feedback circuit such that a delay from the feedback clock signal output terminal 10 of the high-speed interface macro 3 to a feedback clock signal input terminal 13 of the PLL circuit 1 is equal to a delay from the input terminal of the external clock signal to the PLL circuit 1.

Therefore, when the phase difference between the reference clock signal and the feedback clock signal is adjusted at the input of the PLL circuit 1, the phase at the feedback clock signal input terminal becomes in phase with the external clock signal, and that is, the phase at the F/F within the macro 3 becomes in phase with the phase at the input point of the external clock signal.

As described above, the clock signal wiring lines and the clock signal drivers are arranged in the outermost circumferential section of the chip. Also, the area 4 dedicated to the clock signal is provided not to pass other wiring lines. Thus, a clock tree circuit has no or less portion where the internal logic circuit, the high-speed interface macro, and an I/O buffer (not shown) are adjacent to the clock signal wiring line. Therefore, it is possible to reduce the influence of noise such as power supply noise and crosstalk noise caused by the internal logic circuit, the high-speed interface macro, and the I/O buffer. In addition, it is possible to reduce jitter causing clock skew and to prevent a malfunction due to the noise. Moreover, it is possible to reduce the influence of noise produced in the clock signal distribution system including the PLL circuit 1 to the internal logic circuit, the high-speed interface macro and so on.

The use of the outermost circumferential section is restricted for the clock signal distribution wiring line, the clock signal driver, corresponding control signals and so on. Thus, it is possible to prevent the arrangement of other signal lines and to minimize the clock skew due to the difference in coupling capacitance between the wiring lines caused by a density of the wiring lines. It is also possible to reduce the clock skew caused by the influence of manufacturing variations on the chip surface by restricting the arrangement area of the clock signal distribution system to the outermost circumferential section of the chip.

Moreover, since the clock signal distribution area is located in the outermost circumferential section, the characteristics of wiring lines for the internal region, the high-speed interface macro, and the stand-alone IO buffer are not degraded even when a clock signal shield is provided on both sides of the clock signal wiring line or the upper and lower layers thereof for the purpose of preventing noise. Furthermore, by using a plurality of input buffers and PLL circuits, it is possible to shorten the wiring line length for distributing the clock signal to the high-speed interface macro, and to reduce the number of clock signal drivers. As a result, the influence of noise which is one of factors of clock skew can be reduced.

Also, it is possible to prevent the increase of jitter and the malfunction due to the influence of noise by placing the PLL circuit and the clock signal input buffer at the corner of the chip as well as providing the clock signal wiring line and the clock signal driver in the outermost circumferential section. When a plurality of different high-speed interface macros are provided on the LSI, respective macros are different in shape and the clock signal distribution wiring lines are generally arranged around the macro along the shape of the macro. However, the influence of the difference in the macro shape can be ignored by arranging the clock signal distribution system in the outermost circumferential section of the chip and by placing the high-speed interface macro in the inner side of the chip adjacent to the outermost circumferential section.

In another embodiment of the present invention, the basic configuration is the same as the above description, but the clock signal distribution system is not limited to the tree structure with the same load and the same length as shown in FIG. 1. A clock signal distribution system can be employed such as a clock signal tree synthesis (CTS) which can reduce clock skew.

Figure 4:
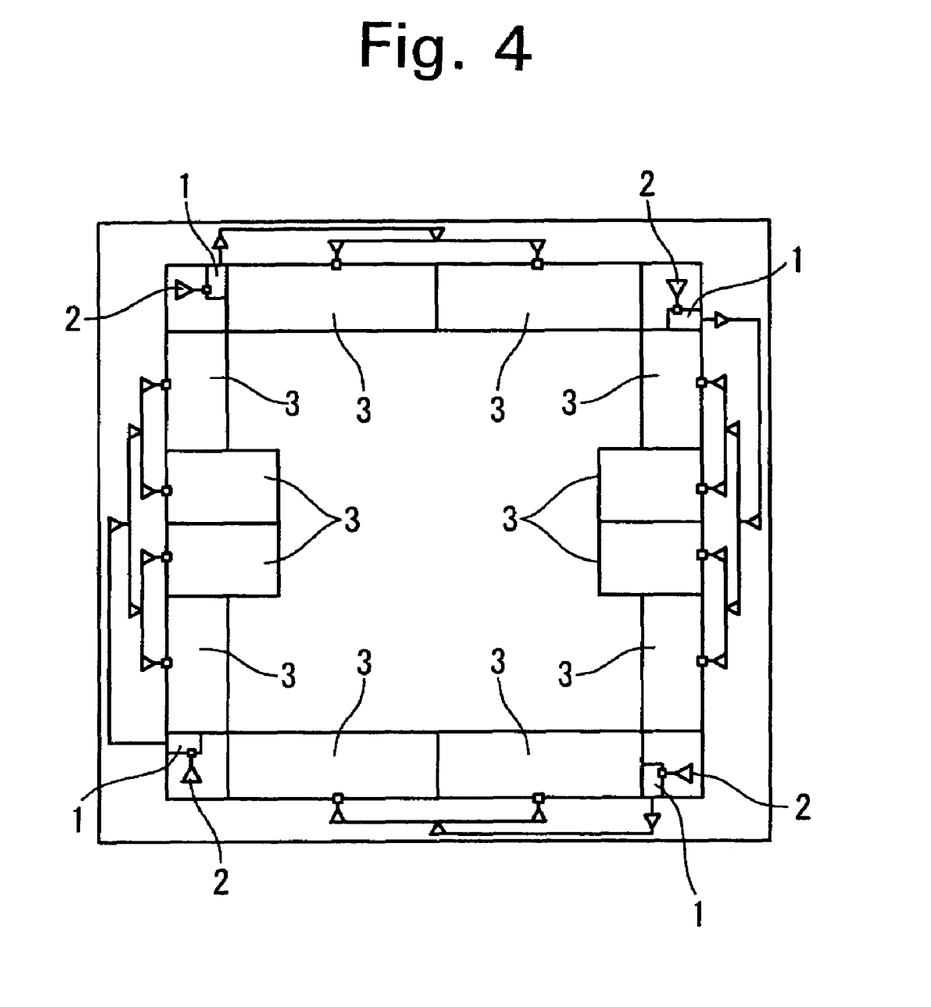
FIG. 4 is a diagram showing another structure of the integrated circuit device according to a second embodiment of the present invention.

Also, the number of clock signal input buffers is arbitrary, although one clock signal input buffer at the upper left corner and another clock signal input buffer at the lower right corner, hence a total of two clock signal input buffers are provided in FIG. 1. Also, the number of the PLL circuits and the number of the high-speed interface macros may be option. While a clock signal input buffer and a PLL circuit are placed at the upper left corner and the lower right corner in FIG. 1, the clock signal input buffers and the PLL circuits can be placed at four corners of the chip as shown in FIG. 4.

It should be noted that any conductive material can be used for the material of the wiring line, although aluminum or copper is used in general.

As described above, according to the present invention, locations of the wiring lines and clock signal drivers for the clock signal to be distributed to the interface circuit and so on the LSI chip are restricted to the area dedicated to the clock signal in the outermost circumferential section of the chip. Also, the interface circuit and so on are arranged in the inner area of the chip adjacent to the clock signal distribution area. Thus, locations of the PLL circuits and the external clock signal input buffers are restricted to the corners of the chip as empty areas. As a result, there is an advantage that the influence of noise and the variation of wiring line capacitance can be reduced and clock skew can be reduced.

There is another advantage that the clock signal can be distributed through the short wiring line without the influence of the difference in shape between a plurality of different high-speed interface macros by arranging the clock signal distribution network in the outermost circumferential section of the chip.

What is claimed is:

1. An integrated circuit device comprising:
    an external clock signal driver on a semiconductor chip which receives an external clock signal;
    a phase locked loop (PLL) circuit located adjacent to said external clock signal driver, said PLL circuit generating a clock signal from said external clock signal supplied from said external clock signal driver;
    a clock signal distribution section arranged in an outer circumferential area of said semiconductor chip to distribute said clock signal; and
    at least one interface circuit block, each of which includes at least an internal circuit operating based on said clock signal supplied from said clock signal distribution section, each said interface circuit block comprising a high-speed interface circuit block arranged in an area of said semiconductor chip adjacent to said clock signal distribution section, one said high-speed interface circuit block providing said PLL circuit a feedback clock signal.

2. The integrated circuit device according to claim 1, wherein said area of said semiconductor chip adjacent to said clock signal distribution section wherein are located said high-speed interface circuit blocks comprises an inner circumferential area relative to said clock signal distribution section.

3. The integrated circuit device according to claim 1, wherein said external clock signal driver is arranged at a corner of said semiconductor chip.

4. The integrated circuit device according to claim 1, wherein said PLL circuit is arranged to be adjacent to said external clock signal driver and said one high-speed interface circuit block.

5. The integrated circuit device according to claim 1, wherein said one high-speed interface circuit block receives said clock signal from said clock signal distribution section at a first terminal and outputs said feedback clock signal to said PLL circuit through a second terminal, and
    said second terminal is arranged such that a delay of said clock signal from said first terminal to said internal circuit is equal to a delay from said first terminal to said second terminal.

6. The integrated circuit device according to claim 5, wherein a signal delay from an input point of said external clock signal to said PLL circuit is set to be equal to a signal delay from said second terminal to said PLL circuit.

7. The integrated circuit device according to claim 1, wherein said clock signal distribution section comprises:
    clock signal distribution wiring lines, each of which transfers said clock signal; and
    clock signal drivers, each of which is arranged at each of ends of each of said clock signal distribution wiring lines.

8. The integrated circuit device according to claim 7, wherein said clock signal distribution wiring lines are arranged to form a tree structure.

9. The integrated circuit device according to claim 7, wherein said clock signal distribution wiring lines are same in lengths to said internal circuits of said interface circuit blocks.

10. The integrated circuit device according to claim 7, wherein said clock signal distribution wiring lines are same in loads to said internal circuits of said interface circuit blocks.

11. An integrated circuit device, comprising:
an external clock signal driver which receives an external clock signal;
a phase locked loon (PLL) circuit located adjacent to said external clock signal driver, said PLL circuit generating a clock signal from said external clock signal supplied to said PLL circuit from said external clock signal driver;
a clock signal distribution section arranged in an outer circumferential area of a semiconductor chip to distribute said clock signal; and
at least one interface circuit block, each of which includes at least an internal circuit operating based on said clock signal supplied from said clock signal distribution section, one of said at least one interface circuit block providing a feedback clock signal to said PLL circuit,
wherein said clock signal distribution section comprises:
clock signal distribution wiring lines, each of which transfers said clock signal; and
clock signal drivers, each of which is arranged at each of ends of each of said clock signal distribution wiring lines,
said interface circuit blocks are arranged in an area of said semiconductor chip adjacent to said clock signal distribution section in an inner circumferential area.

12. The integrated circuit device according to claim 11, wherein said external clock signal driver is arranged at a corner of said semiconductor chip.

13. The integrated circuit device according to claim 11, wherein said PLL circuit is arranged to be adjacent to said external clock signal driver and said one interface circuit block.

14. The integrated circuit device according to claim 11, wherein said one interface circuit block receives said clock signal from said clock signal distribution section at a first terminal and outputs said feedback clock signal to said PLL circuit through a second terminal, and
said second terminal is arranged such that a delay of said clock signal from said first terminal to said internal circuit is equal to a delay from said first terminal to said second terminal.

15. The integrated circuit device according to claim 14, wherein a signal delay from an input point of said external clock signal to said PLL circuit is set to be equal to a signal delay from said second terminal to said PLL circuit.

16. The integrated circuit device according to claim 11, wherein said clock signal distribution wiring lines are arranged to form a tree structure.

17. The integrated circuit device according to claim 16, wherein said clock signal distribution wiring lines are same in lengths to said internal circuits of said interface circuit blocks.

18. The integrated circuit device according to claim 16, wherein said clock signal distribution wiring lines are same in loads to said internal circuits of said interface circuit blocks.

* * * * *